United States Patent
Nayak

(10) Patent No.: US 12,464,340 B2
(45) Date of Patent: Nov. 4, 2025

(54) METHOD AND APPARATUS TO PROVIDE PRIORITY SERVICES TO UE IN WIRELESS NETWORK

(71) Applicant: Samsung Electronics Co., Ltd., Suwon-si (KR)

(72) Inventor: Ashok Kumar Nayak, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/067,065

(22) Filed: Dec. 16, 2022

(65) Prior Publication Data

US 2023/0232207 A1 Jul. 20, 2023

(30) Foreign Application Priority Data

Jan. 17, 2022 (IN) .............................. 202241002627
Jul. 7, 2022 (IN) .............................. 202241002627

(51) Int. Cl.
*H04W 8/20* (2009.01)
*H04W 4/06* (2009.01)
*H04W 60/04* (2009.01)

(52) U.S. Cl.
CPC ............... *H04W 8/20* (2013.01); *H04W 4/06* (2013.01); *H04W 60/04* (2013.01)

(58) Field of Classification Search
CPC ......... H04W 8/20; H04W 4/06; H04W 60/04; H04W 76/12; H04W 4/90; H04W 88/14; H04W 76/50; H04L 65/1066; H04L 65/40; H04L 65/60

See application file for complete search history.

(56) References Cited

U.S. PATENT DOCUMENTS

| 2018/0227743 A1 | 8/2018 | Faccin et al. |
| 2019/0059067 A1* | 2/2019 | Lee ..................... H04L 67/141 |
| 2019/0174449 A1* | 6/2019 | Shan .................... H04W 60/04 |

(Continued)

FOREIGN PATENT DOCUMENTS

| EP | 4057657 A1 | 9/2022 |
| KR | 10-2020-0114916 A | 10/2020 |

(Continued)

OTHER PUBLICATIONS

3GPP TS 23.501 V16.13.0 (Jun. 2022), Technical Specification, 3rd Generation Partnership Project; Technical Specification Group Services and System Aspects; System architecture for the 5G System (5GS); Stage 2 (Release 16), Jun. 2022, 454 pages.

(Continued)

*Primary Examiner* — Ashley Shivers

(57) ABSTRACT

Embodiments herein provide methods for providing priority services to a UE by an AMF. The method includes receiving a request message from the UE, receiving, from a unified data management (UDM), subscription data of the UE, and, based on identifying that the subscription data comprises information related to a priority service and the request message does not include an establishment cause associated with the priority service, sending, to the UE, an accept message for the priority service in response to receiving the request message. The priority service comprises at least one of multimedia priority service (MPS) or mission critical service (MCX).

12 Claims, 6 Drawing Sheets

(56) References Cited

U.S. PATENT DOCUMENTS

2020/0267785 A1\* 8/2020 Talebi Fard ............ H04L 45/04
2021/0076444 A1   3/2021 Shu et al.
2021/0250788 A1\* 8/2021 Kim ..................... H04W 24/04
2024/0031929 A1\* 1/2024 Ryu ..................... H04W 48/16

FOREIGN PATENT DOCUMENTS

| WO | 2019223660 A1 | 11/2019 |
| WO | 2020168310 A1 | 8/2020 |
| WO | 20210091186 A | 5/2021 |

OTHER PUBLICATIONS

Supplementary European Search Report dated Nov. 4, 2024, in connection with European Application No. 22920804.6, 10 pages.
Notice of Submission of Opinions dated Nov. 21, 2024, in connection with Korean Application No. 10-2024-7010041, 10 pages.
International Search Report and Written Opinion of the International Searching Authority dated Mar. 13, 2023, in connection with International Application No. PCT/KR2022/019723, 8 pages.
Samsung, "UE SM context fetch in registration procedure during inter-network mobility," S2-2108442, 3GPP TSG-SA WG2 Meeting #148E, E-Meeting, Nov. 15-22, 2021, 36 pages.
3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17), Dec. 2021, 559 pages.

\* cited by examiner

METHOD AND APPARATUS TO PROVIDE PRIORITY SERVICES TO UE IN WIRELESS NETWORK

CROSS-REFERENCE TO RELATED APPLICATIONS

This application is based on and claims priority under 35 U.S.C. § 119(a) of an Indian Provisional patent application number 202241002627, filed on Jan. 17, 2022, in the Indian Patent Office, and of an Indian Complete patent application number 202241002627, filed on Jul. 7, 2022, in the Indian Patent Office, the disclosure of each of which is incorporated by reference herein in its entirety.

BACKGROUND

1. Field

The present disclosure relates to field of supporting priority services like multimedia priority service (MPS) and mission critical service (MCX) and more particularly, to systems and methods of ensuring that $5^{th}$ generation (5G) system is able to provide the services when a user equipment (UE) is not preconfigured with MPS and MCX capability in a universal subscriber identity module (USIM).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, 3GPP standard TS 23.501, "Subscription-related Priority Mechanisms include the ability to prioritize flows based on subscription information, including the prioritization of Radio Resource Control (RRC) Connection Establishment based on Unified Access Control mechanisms and the establishment of prioritized quality of service (QoS) Flows," where "including" refers to examples, and what follows is not to be interpreted as a complete set of uses. A UE that has an Access Identity of 1 MPS (for example) through a USIM or other means (i.e., registration) may use a priority establishment cause.

This is specified in 3GPP standard TS 24.501. Here, it states that when the UE is provisioned with Access Identity 1 MPS, the UE uses an RRC establishment cause with mps-PriorityAccess for any Access Category and this is irrespective of service usage. Thus, service users with the UEs with the MPS subscription, for example, may have the UE sending a priority establishment cause for any interaction with a network, whether there is congestion or not, independent of the type of service request.

However, there are cases, for example, when the USIM may not have been provisioned with a priority subscription and an operator is in the process of adding to a unified data management (UDM) an MPS and/or MCX subscription for the UE. The provided method and system is addressing the problem of providing priority services to the UE when the UE does not have any pre-configuration of a priority subscription.

The principal object of the embodiments herein is to provide an enhancement in procedure for providing MPS and MCX services to a UE when the UE is not preconfigured with MPS and MCX capability in a universal subscriber identity module (USIM) of the UE. The provided method can be used to assist the UE to receive priority treatment from network to receive a MPS and a MCX in scenarios where UE's USIM is not preconfigured with MPS/MCX by the network.

SUMMARY

Accordingly, the embodiment herein discloses a method for providing priority services to a user equipment (UE) by an access and mobility management function (AMF) in a wireless network. The method may include receiving a request message from the UE, receiving, from a unified data management (UDM), subscription data of the UE, and based on identifying that the subscription data comprises information related to a priority service and the request message does not include an establishment cause associated with the priority service, sending, to the UE, an accept message for the priority service in response to receiving the request message.

Accordingly, the embodiment herein discloses a method for receiving priority services by a user equipment (UE) in a wireless network. The method may include sending, to an access and mobility management function (AMF), a request message without an establishment cause associated with a priority service, receiving, from the AMF, an accept message for the priority service, based on the AMF identifying that subscription data of the UE in a unified data management (UDM) comprises information related to the priority service and the request message does not include the establishment cause associated with the priority service, and receiving, from the AMF, priority services information related to the priority service.

Accordingly, the embodiment herein discloses an AMF to provide priority services to a user equipment (UE) in a wireless network. The AMF may include memory, a communicator, and a processor, communicatively coupled with the memory and the communicator. The processor may be configured to: receive, from the UE, a request message, receive, from a unified data management (UDM), subscription data of the UE, and, based on identifying that the subscription data comprises information related to a priority service and the request message does not include an establishment cause associated with the priority service, send, to the UE, an accept message for the priority service in response to receiving the request message.

Accordingly, the embodiment herein discloses a user equipment (UE) to provide priority services in a wireless network. The UE may include memory, a communicator, and a processor, communicatively coupled with the memory and the communicator. The processor may be configured to: send, to an access and mobility management function (AMF), a request message without an establishment cause associated with a priority service, receive, from the AMF, an accept message for the priority service, based on the AMF identifying that subscription data of the UE in a unified data management (UDM) comprises information related to the priority service and the request message does not include the establishment cause associated with the priority service, and receive, from the AMF, priority services information related to the priority service.

Accordingly, the embodiment herein discloses a method for providing at least one of MPS and MCX services to a UE in a wireless network. The method includes receiving, by an access and mobility management function (AMF) apparatus, a notification from a UDM apparatus indicating enablement of at least one of the MPS and MCX services. Further, the method includes sending, by the AMF apparatus, at least one of the MPS and MCX priority services information to the UE in response to receiving the notification from the UDM apparatus. Further, the method includes receiving, by the AMF apparatus, a request message for at least one of the MPS and MCX services from the UE, wherein the request message is received "with a priority indication indicating at least one of the MPS and MCX priority services" or "without priority indication." Further, the method includes performing, by the AMF apparatus, one of: sending an accept message for at least one of the MPS and MCX services in response to receiving the request message with the priority indication, and prioritizing by the AMF apparatus the request message received from the AMF apparatus based on the notification received from the UDM apparatus in response to receiving the request message without the priority indication, and sending an accept message for at least one of the MPS and MCX services.

Accordingly, the embodiment herein discloses a method providing at least one of MPS and MCX services to a UE in a wireless network. The method includes receiving, by the UE, at least one of MPS and MCX priority services information from the AMF apparatus. Further, the method includes sending, by the UE, a request message to the AMF apparatus (200) for at least one of the MPS and MCX services. The request message is received "with a priority indication indicating at least one of the MPS and MCX priority services in response to receiving at least one of the MPS and MCX priority services information from the AMF apparatus" or "without priority indication." Further, the method includes receiving, by the UE, an accept message for at least one of the MPS and MCX services from one of the AMF apparatus and an SMF apparatus with or without sending the priority indication with the request message to the AMF apparatus.

Accordingly, the embodiment herein discloses an AMF apparatus for providing at least one of MPS and MCX services to a UE in a wireless network. The AMF apparatus includes a priority treatment controller communicatively coupled to a memory and a processor. The priority treatment controller is configured to receive a notification from a UDM apparatus indicating enablement of at least one of the MPS and MCX services. Further, the priority treatment controller is configured to send at least one of the MPS and MCX priority services information to the UE in response to receiving the notification from the UDM apparatus. Further, the priority treatment controller is configured to receive a request message for at least one of the MPS and MCX services from the UE. The request message is received "with a priority indication indicating at least one of the MPS and MCX priority services" or "without priority indication." Further, the priority treatment controller is configured to perform one of send an accept message for at least one of the MPS and MCX services in response to receiving the request message with the priority indication, and prioritize by the AMF apparatus the request message received from the AMF apparatus based on the notification received from the UDM apparatus in response to receiving the request message without the priority indication, and sending an accept message for at least one of the MPS and MCX services.

Accordingly, the embodiment herein discloses a UE for providing at least one of MPS and MCX services in a wireless network. The UE includes a priority treatment controller communicatively coupled to a memory and a processor. The priority treatment controller is configured to receive at least one of MPS and MCX priority services information from the AMF apparatus. The priority treatment controller is configured to send a request message to the AMF apparatus (200) for at least one of the MPS and MCX services, wherein the request message is received "with a priority indication indicating at least one of the MPS and MCX priority services in response to receiving at least one of the MPS and MCX priority services information from the AMF apparatus" or "without priority indication." Further, the priority treatment controller is configured to receive an accept message for at least one of the MPS and MCX services from one of the AMF apparatus and an SMF apparatus with or without sending the priority indication with the request message to the AMF apparatus.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1:
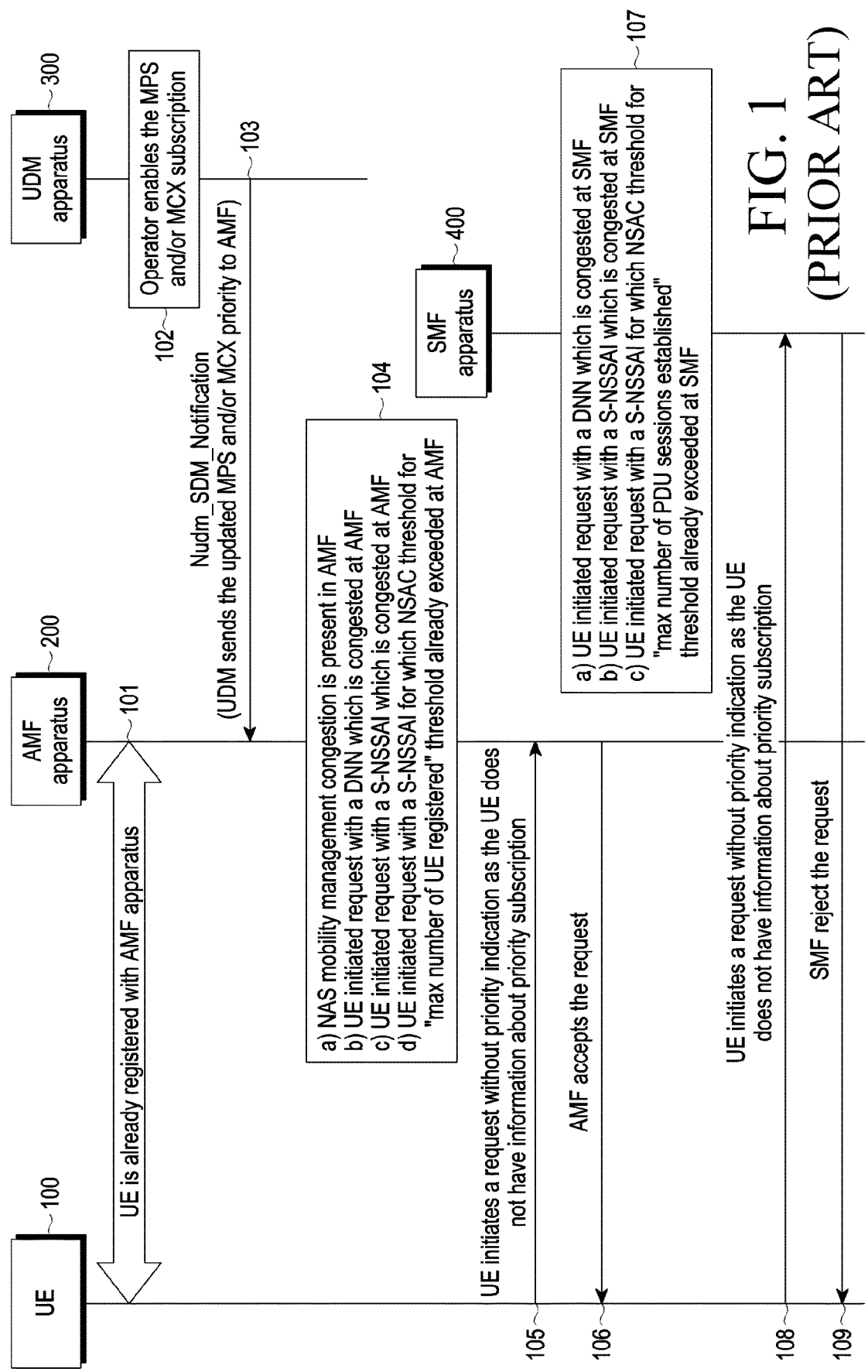
FIG. 1 illustrates a scenario that a network rejects a UE initiated request where priority indication is not present in an establishment cause.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for provisioning procedures to provide at least one of MPS and MCX services to a UE in a wireless network. The method includes receiving, by an AMF apparatus, a notification from a UDM apparatus indicating enablement of at least one of the MPS and MCX services. Further, the method includes sending, by the AMF apparatus, at least one of the MPS and MCX priority services information to the UE in response to receiving the notification from the UDM apparatus. Further, the method includes receiving, by the AMF apparatus, a request message for at least one of the MPS and MCX services from the UE, wherein the request message is received "with a priority indication indicating at least one of the MPS and MCX priority services" or "without priority indication." Further, the method includes performing, by the AMF apparatus, one of: sending an accept message for at least one of the MPS and MCX services in response to receiving the request message with the priority indication, and prioritizing by the AMF apparatus the request message received from the AMF apparatus based on the notification received from the UDM apparatus in response to receiving the request message without the priority indication, and sending an accept message for at least one of the MPS and MCX services.

The provided method provides a scenario of where a network accepts a UE initiated request where a priority indication is not present in an establishment cause. The provided method assists in providing priority treatment by a radio access network (RAN) & core network (CN) network functions (NFs). Also, the UE may be knowing after activation of MPS & MCX so that the UE may be able to provide priority cause while initiating any requests towards the network.

After operator updates the MPS & MCX priority services information in user's subscription profile and the UDM apparatus updates to AMF apparatus, it is provided that the AMF apparatus updates this information to the UE through a UE configuration update (UCU) or a UE parameter update (UPU) procedure. when the UE has not sent priority cause, but the AMF apparatus has found that UE's subscription profile has been activated for the MPS & MCX service, then it is provided to provide priority treatment instead of rejecting the request. Also, it is provided that AMF apparatus adds a message priority header value and relay for other NFs so that all the CN NFs can provide priority treatment.

Referring now to the drawings and more particularly to FIGS. 2 through 7, where similar reference characters denote corresponding features consistently throughout the figures, there are shown preferred embodiments.

FIG. 1 illustrates a scenario that a network (e.g., AMF apparatus (200) rejects a UE (100) initiated request where a priority indication is not present in an establishment cause.

The UE (100) gets the priority services like MPS and/or MCX from the network by providing the priority information in the establishment cause case based on the pre-configuration of priority subscription in an USIM. But when operator has enabled the priority subscription in an UDM apparatus (300) then the 3GPP as defined that based on operator policy, an AMF apparatus (200) may update the priority subscription in a registration accept message. After that the UE (100) may be able to initiate priority services based upon the received updated information from the AMF apparatus (200).

But it may happen that the operator updates the priority subscription for the UE (100) when the UE is already registered with the network. In this case though, the UDM apparatus (300) updates the priority subscription to the AMF apparatus (200) that is not known by the UE (100). Hence, the UE (100) initiates the service without a priority indication in the establishment cause and during congestion the session may not be accepted by the network even when the UE (100) is having the priority subscription. Examples are as follows:
  a. A non-access stratum (NAS) mobility management congestion is present in the AMF apparatus (200);
  b. The UE (100) initiated request with a data network name (DNN) which is congested at the AMF apparatus (200) and/or the SMF apparatus (400);
  c. The UE (100) initiated request with a single network slice selection assistance information (S-NSSAI) which is congested at the AMF apparatus (200) and/or the SMF apparatus (400);
  d. The UE (100) initiated request with the S-NSSAI for which a network slice admission control (NSAC) threshold for "max number of UE registered" and/or "max number of PDU sessions established) threshold already exceeded at the AMF apparatus (200) and/or SMF apparatus (400); and e. A radio access network (RAN) is congested.

These are few examples where the network may reject the UE (100) initiated requests because the UE (100) does not send the priority indication in the establishment cause even when the priority subscription is already configured for the UE (100) by the operator in the UDM apparatus (300).

As explained above, the UE (100) initiated session may be rejected because the UE (100) does not send the priority indication in the establishment cause even when the operator has updated the priority subscription for the user in the UDM apparatus (300).

As shown in the FIG. 1, at step 101, the UE (100) may be already registered with the AMF apparatus (200). At step 102, the operator of the UDM apparatus (300) may enable the MPS and/or MCX subscription. At step 103, the UDM apparatus (300) may send a Nudm_SDM_Notification (i.e., UDM apparatus (300) send the updated MPS and/or MCX priority) to the AMF apparatus (200). At step 104, the AMF apparatus (200) may determine that at least one of a NAS mobility management congestion is present in the AMF apparatus (200), the UE (100) is initiated the request with the DNN which is congested at the AMF apparatus (200), the UE (100) is initiated request with the S-NSSAI which is congested at the AMF apparatus (200), and/or the UE (100) is initiated request with a S-NSSAI for which NSAC threshold for "max number of UE registered" threshold already exceeded at the AMF apparatus (200). At step 105, the UE (100) may initiate the request without priority indication to the AMF apparatus (200) as the UE (100) does not have information about priority subscription. At step 106, the AMF apparatus (200) may reject the request.

At step 107, the SMF apparatus (400) may determine at least one of the UE (100) is initiated the request with the DNN which is congested at the SMF apparatus (400), the UE (100) may be initiated request with the S-NSSAI which is congested at the SMF apparatus (400), and the UE (100) may be initiated request with the S-NSSAI for which NSAC threshold for "max number of PDU sessions established" threshold already exceeded at the SMF apparatus (400). At step 108, the UE (100) may initiate the request without priority indication as the UE (100) does not have information about priority subscription. At step 109, the SMF apparatus (400) may reject the request.

Figure 2:
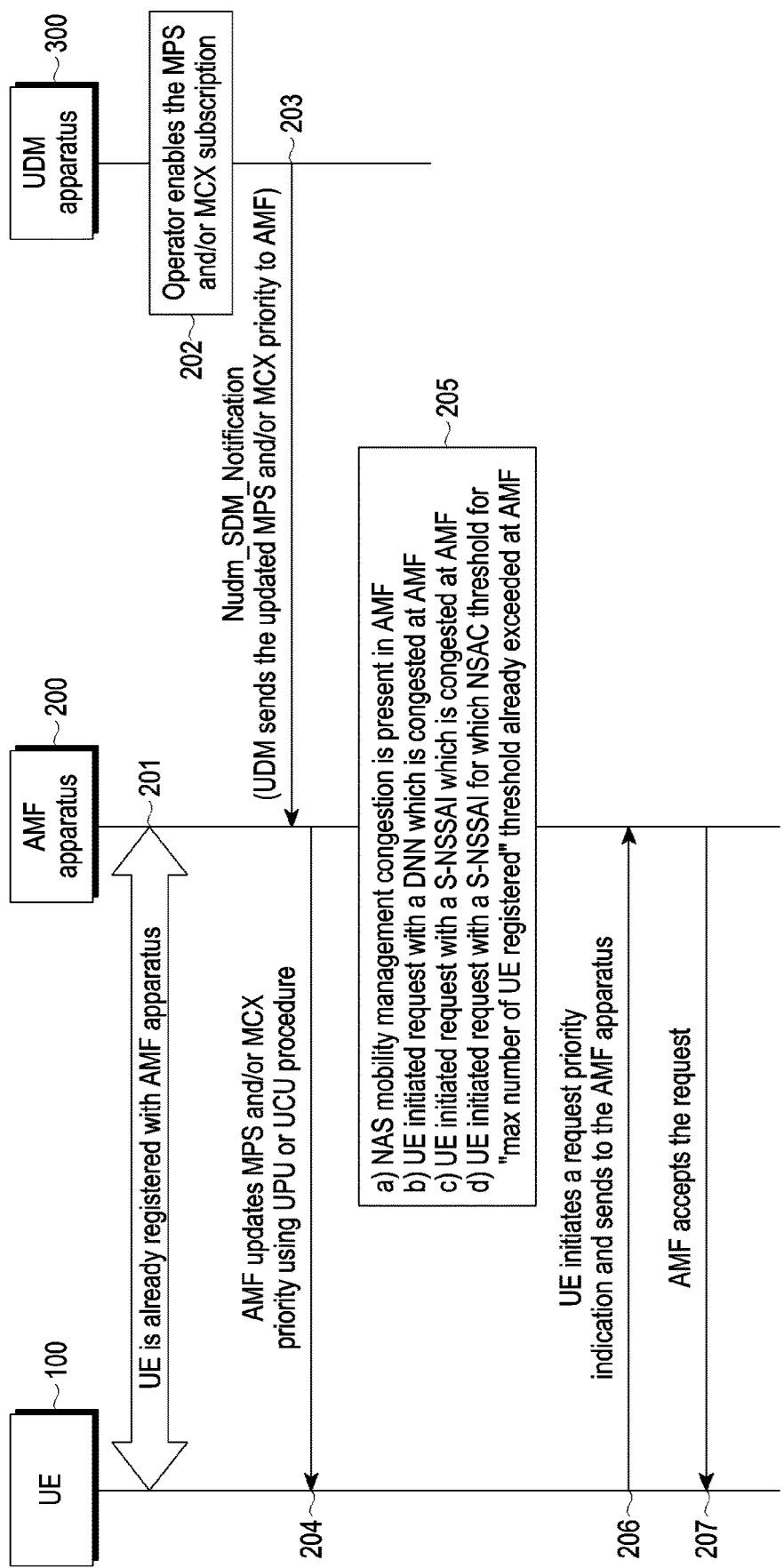
FIG. 2 illustrates a scenario that the network (e.g., AMF apparatus or the like) accepts the UE initiated request where priority indication is not present in the establishment cause according to various embodiments of the present disclosure.

FIG. 2 illustrates a scenario that the network (e.g., AMF apparatus (200)) accepts the UE (100) initiated the request where the priority indication is not present in the establishment cause according to various embodiments of the present disclosure.

The provided method can be used to update the UE (100) about "MPS priority (e.g., priority subscription indication)" and/or "MCX priority" using the UCU (UE configuration update procedure) or the UPU (UE parameter update) procedure. Then, the UE (100) updates the priority subscription received from the network and send the priority indication in the establishment cause while initiating any session from the network.

It is also provided that when the UE (100) is being informed by other means about operator enabling the MPS and/or MCX priority subscription in the UDM apparatus (300) then the UE can deregister from the network and does initial registration procedure to receive the priority subscription information from the network in the registration accept message.

As shown in the FIG. 2, at step 201, the UE (100) may be already registered with the AMF apparatus (200). At step 202, the operator of the UDM apparatus (300) may enable the MPS and/or MCX subscription. At step 203, the UDM apparatus (300) may send the Nudm_SDM_Notification (i.e., UDM apparatus (300) send the updated MPS and/or MCX priority) to the AMF apparatus (200). At step 204, the AMF apparatus (200) may update the MPS and/or MCX priority to the UE (100) using UPU or UCU procedure. At step 205, the AMF apparatus (200) may determine that at least one of the NAS mobility management congestion is present in the AMF apparatus (200), the UE (100) is initiated request with the DNN which is congested at the AMF apparatus (200), the UE (100) is initiated request with a S-NSSAI which is congested at the AMF apparatus (200), and/or the UE (100) is initiated the request with the S-NSSAI for which NSAC threshold for "max number of UE registered" threshold already exceeded at the AMF apparatus (200). At step 206, the UE (100) may initiate the request priority indication and send the request priority indication to the AMF apparatus (200). At step 207, the AMF apparatus (200) may accept the request.

Figure 3:
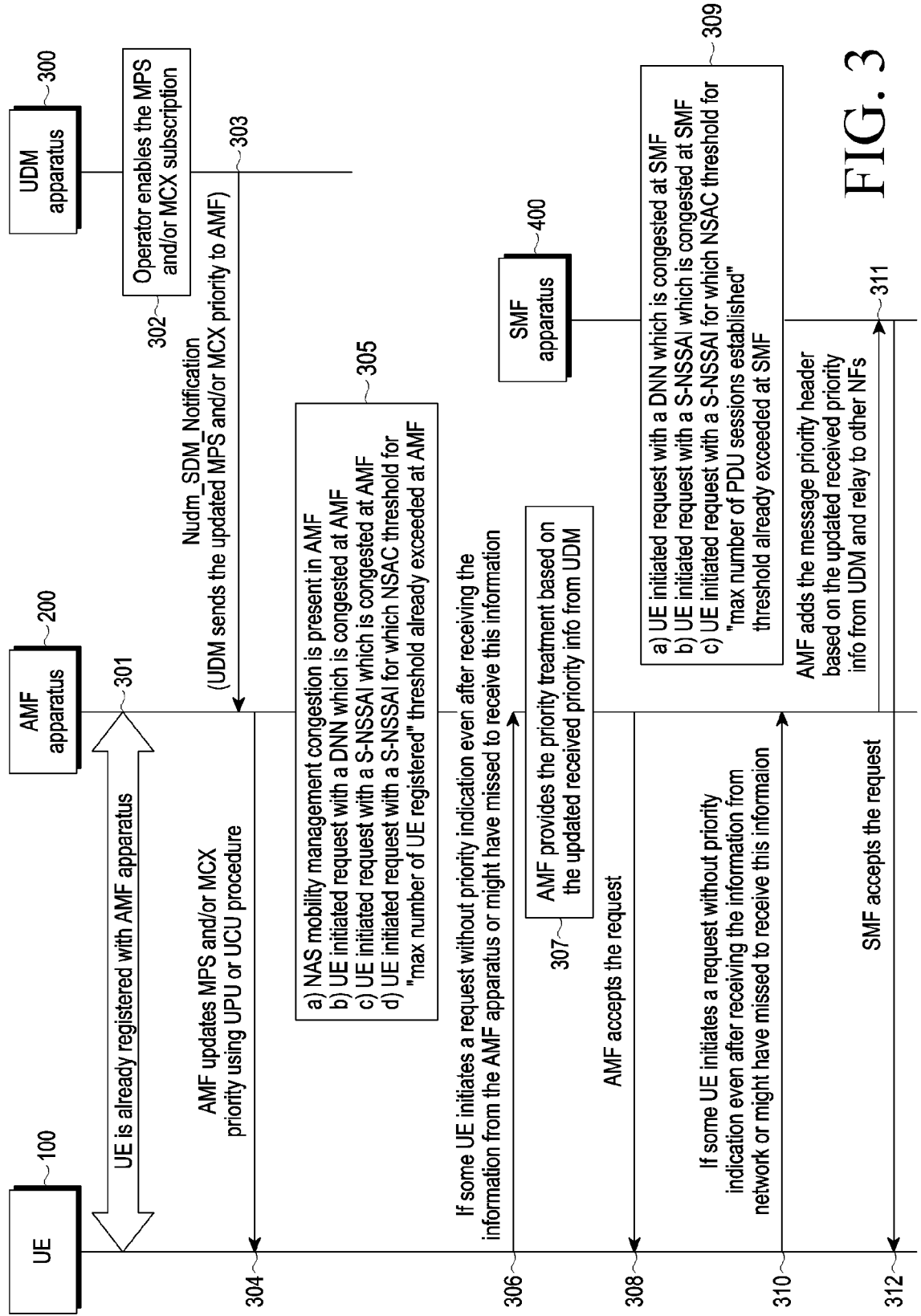
FIG. 3 illustrates another scenario that the network accepts the UE initiated request where priority indication is not present in the establishment cause according to various embodiments of the present disclosure.

FIG. 3 illustrates another scenario that the network (e.g., AMF apparatus (200)) accepts the UE initiated request where the priority indication is not present in the establishment cause according to various embodiments of the present disclosure.

At step 301, the UE (100) may be already registered with the AMF apparatus (200). At step 302, the operator of the UDM apparatus (300) may enable the MPS and/or MCX subscription. At step 303, the UDM apparatus (300) may send the Nudm_SDM_Notification (i.e., UDM apparatus (300) send the updated MPS and/or MCX priority) to the AMF apparatus (200). At step 304, the AMF apparatus (200) may update the MPS and/or MCX priority to the UE (100) using the UPU or UCU procedure. At step 305, the AMF apparatus (200) may determine that the NAS mobility management congestion is present in the AMF apparatus (200), the UE (100) is initiated request with the DNN which is congested at the AMF apparatus (200), the UE (100) is initiated request with the S-NSSAI which is congested at the AMF apparatus (200), and/or the UE (100) is initiated request with the S-NSSAI for which NSAC threshold for "max number of UE registered" threshold already exceeded at the AMF apparatus (200).

At step 306, the AMF apparatus (200) may identify that some UE (e.g., UE (100)) initiates the request without priority indication in initial registration request or after the UE receiving at least one of the MPS and MCX priority services information from the AMF apparatus (200), and/or when the UE (100) misses receiving at least one of the MPS and MCX priority services information from the AMF apparatus (200) in other NAS message. At step 307, the AMF apparatus (200) may provide the priority treatment based on the updated received priority information from the UDM apparatus (300). At step 308, the AMF apparatus (200) may accept the request.

At step 309, the SMF apparatus (400) may determine that at least one of the UE (100) is initiated request with the DNN which is congested at the SMF apparatus (400), the UE (100) is initiated request with the S-NSSAI which is congested at the SMF apparatus (400), and/or the UE (100) is initiated request with the S-NSSAI for which NSAC threshold for "max number of PDU sessions established" threshold already exceeded at the SMF apparatus (400). At step 310, the AMF apparatus (200) may identify that some UE (e.g., UE (100)) initiates the request without priority indication in initial registration request or after the UE receiving at least one of the MPS and MCX priority services information from the AMF apparatus (200), and/or when the UE (100) misses receiving at least one of the MPS and MCX priority services information from the AMF apparatus (200) in other NAS message. At step 311, the AMF apparatus (200) may add the message Priority header based on the updated received priority information from the UDM apparatus (300) and relay to other NFs (e.g., SMF apparatus (400)). At step 312, the SMF apparatus (400) may accept the request.

Referring to the FIG. 3 considering the provided method, as per 3GPP "when the establishment cause is associated with priority services (e.g., MPS, MCX), the AMF apparatus (200) includes the message priority header to indicate priority information. Other NFs relay the priority information by including the message priority header in service-based interfaces." Based on the message priority header all other NFs provide priority treatment to the UE initiated requests.

In the present problem scenario, the AMF apparatus (200) receives the updated MPS and/or MCX priority subscription from UDM apparatus (300) but not sharing to the UE (100) because of which UE (100) initiates session without adding priority indication in the establishment cause and it's get rejected.

As part of the solution it is provided that after the AMF apparatus (200) receives the request from the UE (100) without priority indication in the establishment cause, the AMF apparatus (200) still provides the priority treatment based on the updates priority subscription the AMF apparatus has received from the UDM apparatus (300) and accepts the request as priority requests.

If the AMF apparatus (200) did not receive a designated establishment cause (i.e. high priority access), but when the AMF apparatus (200) determines that there is a priority subscription (e.g. MPS, MCX) in the UDM apparatus (300) for that UE (100), the AMF apparatus (200) may provide priority handling for that the UE (100) at that time.

In an embodiment, the AMF apparatus (200), based on this updated received priority subscription information from the UDM apparatus (300), may add the message priority header and relay to other NFs so that all the NFs start giving priority treatment.

When the AMF apparatus (200) receives the priority indication (e.g. MPS, MCX) as part of the access and mobility subscription data, but the UE (100) did not provide the establishment cause associated with priority services, the AMF apparatus (200) may include the message priority header to indicate priority information for all subsequent messages. Other NFs relay the priority information by including the message priority header in service-based interfaces, as specified in 3GPP standard specification TS 29.500.

When the establishment cause is associated with priority services (e.g., MPS, MCX or the like), or when the AMF apparatus (200) determines that the UE (100) has priority subscription (e.g. MPS, MCX or the like) in the UDM apparatus (300), the AMF apparatus (200) includes the message priority header to indicate priority information. Other NFs relay the priority information by including the message priority header in service-based interfaces, as specified in 3GPP standard specification TS 29.500.

When the establishment cause received as part of AN parameters during the Registration procedure or service request procedure is associated with priority services (e.g. MPS, MCX or the like), or when the AMF apparatus (200) determines the UE (100) has priority subscription (e.g. MPS, MCX or the like) in the UDM apparatus (300), the AMF apparatus (200) includes the message priority header to indicate priority information.

Figure 4:
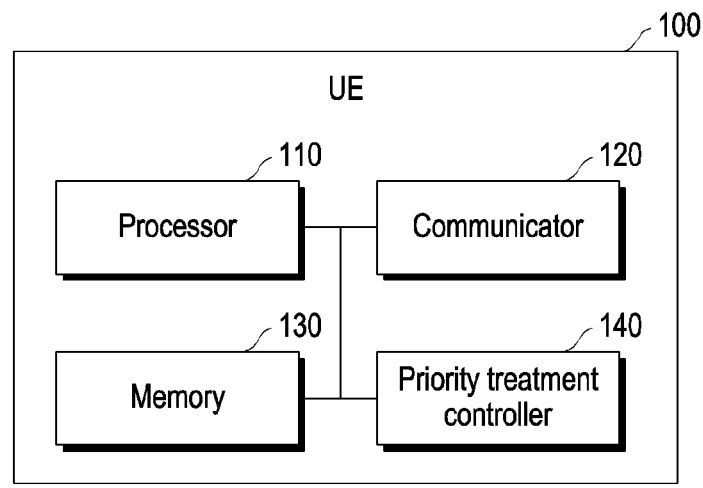
FIG. 4 illustrates various hardware components of a UE according to various embodiments of the present disclosure.

FIG. 4 illustrates various hardware components of the UE (100), according to various embodiments of the present disclosure. In an embodiment, the UE (100) may include at least one of a processor (110), a communicator (120), a memory (130) or a priority treatment controller (140). The processor (110) may be coupled with the communicator (120), the memory (130) and the priority treatment controller (140). In an embodiment, the processor (110) may include the priority treatment controller (140).

The priority treatment controller (140) may receive the at least one of MPS and MCX priority services information from the AMF apparatus (200). The priority treatment controller (140) may send the request message for at least one of the MPS and MCX services from the UE (100). The request message may be received "with the priority indication indicating at least one of the MPS and MCX priority services in response to receiving at least one of the MPS and MCX priority services information from the AMF apparatus (200)" or "without priority indication" in initial registration request or after the UE receiving at least one of the MPS and MCX priority services information from the AMF apparatus (200), and/or when the UE (100) misses receiving at least one of the MPS and MCX priority services information from the AMF apparatus (200) in other NAS message. The priority treatment controller (140) may receive the accept message for at least one of the MPS and MCX services from one of the AMF apparatus (200) and the SMF apparatus (400) with or without sending the priority indication with the request message to the AMF apparatus (200).

The priority treatment controller (140) may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

In an embodiment, the processor (110) may be configured to execute instructions stored in the memory (130) and to perform various processes. The communicator (120) may be configured for communicating internally between internal hardware components and with external devices (e.g., (R)AN, the AMF apparatus (200), or the SMF apparatus (400)) via one or more networks. The memory (130) may also store instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 4 shows various hardware components of the UE (100), but it is to be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 5:
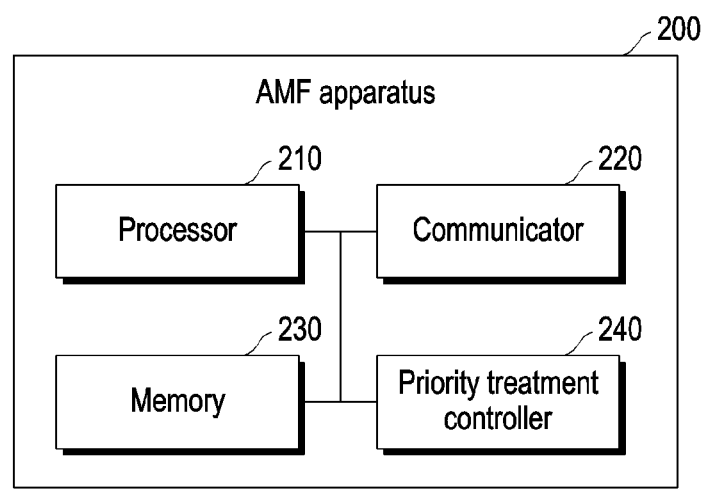
FIG. 5 illustrates various hardware components of an AMF apparatus according to various embodiments of the present disclosure.

FIG. 5 illustrates various hardware components of the AMF apparatus (200) according to various embodiments of the present disclosure. In an embodiment, the AMF apparatus (200) may include at least one of a processor (210), a communicator (220), a memory (230) or a priority treatment controller (240). The processor (210) may be coupled with the communicator (220), the memory (230) and the priority treatment controller (240). In an embodiment, the processor (210) may include the priority treatment controller (240).

The priority treatment controller (240) may receive the notification from the UDM apparatus (300) indicating enablement of at least one of the MPS and MCX services. The priority treatment controller (240) may send at least one of the MPS and MCX priority services information to the UE (100) in response to receiving the notification from the UDM apparatus (300). The priority treatment controller (240) may receive the request message for at least one of the MPS and MCX services from the UE (100). The MPS and MCX priority services information may be updated to the UE (100) through the UCU procedure or the UPU procedure. The request message may be received "with the priority indication indicating the MPS and MCX priority services" or "without priority indication." In an embodiment, the request message may be received even after the UE receiving the MPS and MCX priority services information from the AMF apparatus (200) or missing receiving at least one of the MPS and MCX priority services information from the AMF apparatus (200). In an embodiment, the priority treatment controller (240) may send the accept message for the MPS and MCX services in response to receiving the request message with the priority indication. In an embodiment, the priority treatment controller (240) may prioritize the request message received from the AMF apparatus (200) based on the notification received from the UDM apparatus (300) in response to receiving the request message without the priority indication and send the accept message for at least one of the MPS and MCX services.

In an embodiment, the priority treatment controller (240) may add the message priority header based on the notification received from the UDM apparatus (300). Further, the priority treatment controller (240) may send the request message received from the AMF apparatus (200) to the SMF apparatus (400).

The priority treatment controller (240) may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

In an embodiment, the processor (210) may be configured to execute instructions stored in the memory (230) and to perform various processes. The communicator (220) may be configured for communicating internally between internal hardware components and with external devices (e.g., the UE (100), the UDM apparatus (300), or the SMF apparatus (400)) via one or more networks. The memory (230) may also store instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 5 illustrates various hardware components of the AMF apparatus (200) but it is to be understood that other embodiments are not limited thereon. In other embodiments, the AMF apparatus (200) may include less or more number of components. Further, the labels or names of the components are used only for illustrative purpose and does not limit the scope of the present disclosure. One or more components can be combined together to perform same or substantially similar function in the AMF apparatus (200).

Figure 6:
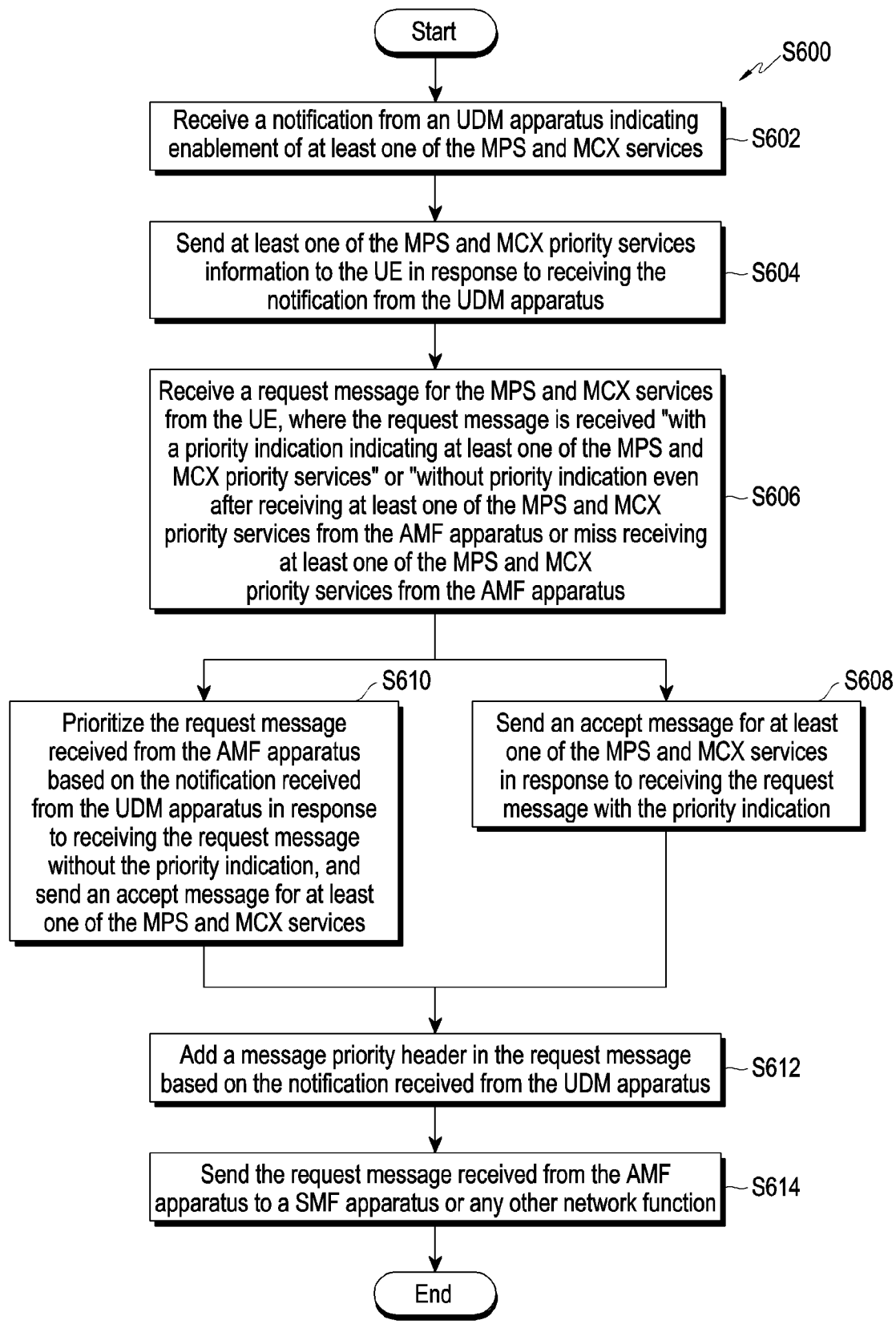
FIG. 6 illustrates a flow chart of a method, implemented by the AMF apparatus, for provisioning procedures to provide at least one of MPS or MCX priority services information to the UE in a wireless network according to various embodiments of the present disclosure.

FIG. 6 illustrates a flow chart (S600) of a method, implemented by the AMF apparatus (200), for provisioning procedures to provide at least one of MPS and MCX services to the UE (100) in the wireless network (1000) according to various embodiments of the present disclosure. At least one of the operations (S602-S614) is handled by the priority treatment controller (240).

At operation S602, the method may include receiving the notification from the UDM apparatus (300) indicating enablement of at least one of the MPS and MCX services. At operation S604, the method may include sending at least one of the MPS and MCX priority services information to the UE (100) in response to receiving the notification from the UDM apparatus (300). At operation S606, the method may include receiving the request message for the MPS and MCX services from the UE (100). The request message may be received "with the priority indication indicating at least one of the MPS and MCX priority services" or "without priority indication" in initial registration request or after the UE receiving at least one of the MPS and MCX priority services information from the AMF apparatus (200), and/or when the UE (100) misses receiving at least one of the MPS and MCX priority services information from the AMF apparatus (200) in other NAS message.

At operation S608, the method may include sending the accept message for the MPS and MCX services in response to receiving the request message with the priority indication. At S610, the method may include prioritizing the request message received from the AMF apparatus (200) based on the notification received from the UDM apparatus (300) in response to receiving the request message without the priority indication and sending the accept message for the MPS and MCX services. At 612, the method may include adding the message priority header in the request message based on the notification received from the UDM apparatus (300). At S614, the method may include sending the request message to the SMF apparatus (400) or any other network function in the wireless network.

Figure 7:
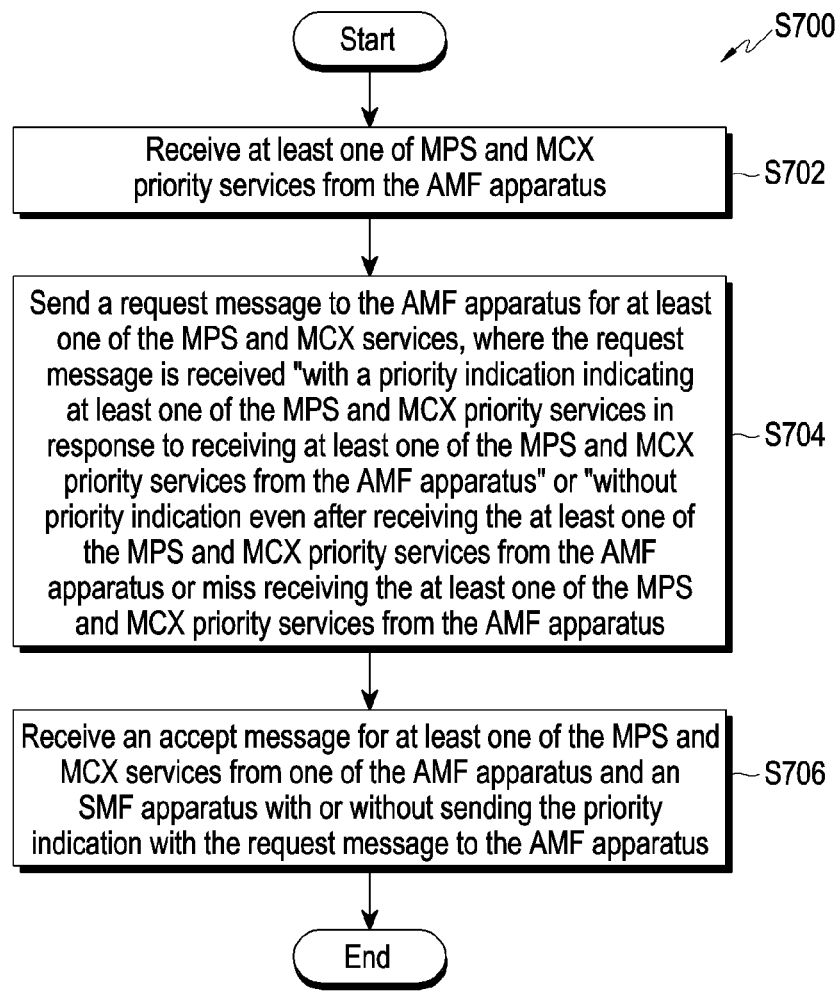
FIG. 7 illustrates a flow chart of a method, implemented by the UE, for provisioning procedures to provide at least one of MPS or MCX priority services information to the UE in the wireless network according to various embodiments of the present disclosure.

FIG. 7 illustrates a flow chart (S700) of a method, implemented by the UE (100), for provisioning procedures to provide the MPS and MCX services to the UE (100) in the wireless network (1000) according to various embodiments of the present disclosure. At least one of the operations (S702-S706) is handled by the priority treatment controller (140).

At operation S702, the method may include receiving the MPS and MCX priority services information from the AMF apparatus (200). At operation S704, the method may include sending the request message to the AMF apparatus (200) for the MPS and MCX services. The request message may be received "with the priority indication indicating at least one of the MPS and MCX priority services in response to receiving at least one of the MPS and MCX priority services information from the AMF apparatus (200)" or "without priority indication" in initial registration request or after the UE receiving at least one of the MPS and MCX priority services information from the AMF apparatus (200) or when the UE (100) misses receiving at least one of the MPS and MCX priority services information from the AMF apparatus (200) in other NAS message. At operation S706, the method may include receiving the accept message for the MPS and MCX services from the AMF apparatus (200) and an SMF apparatus (400) with or without sending the priority indication with the request message to the AMF apparatus (200).

Before the AMF apparatus (200) forwards to the SMF apparatus (400), the existing procedure may be to select the SMF apparatus (400) and for that the SMF apparatus may do the discovery of SMF selection from NRF apparatus. Hence, the AMF apparatus (200) may send the request to NRF and here also that message priority header may be added. In summary though the call flow is shown from AMF apparatus (200) to the SMF apparatus only but the AMF apparatus (200) may add this message priority header to any NFs. The SMF apparatus (400) may be just one example.

Accordingly, the embodiment herein discloses a method for providing priority services to a user equipment (UE) 100 by an access and mobility management function (AMF) 200 in a wireless network 1000. The method may include receiving a request message from the UE, receiving, from a unified data management (UDM) 300, subscription data of the UE, and based on identifying that the subscription data comprises information related to a priority service and the request message does not include an establishment cause associated with the priority service, sending, to the UE, an accept message for the priority service in response to receiving the request message.

Accordingly, the embodiment herein discloses a method for receiving priority services by a user equipment (UE) 100 in a wireless network 1000. The method may include sending, to an access and mobility management function (AMF) 200, a request message without an establishment cause associated with a priority service, receiving, from the AMF, an accept message for the priority service, based on the AMF identifying that subscription data of the UE in a unified data management (UDM) 300 comprises information related to the priority service and the request message does not include the establishment cause associated with the priority service, and receiving, from the AMF, priority services information related to the priority service.

Accordingly, the embodiment herein discloses an AMF 200 to provide priority services to a user equipment (UE) 100 in a wireless network 1000. The AMF may include memory 230, a communicator 220, and a processor 210, 240, communicatively coupled with the memory and the communicator. The processor may be configured to: receive, from the UE, a request message, receive, from a unified data management (UDM), subscription data of the UE, and, based on identifying that the subscription data comprises information related to a priority service and the request message does not include an establishment cause associated with the priority service, send, to the UE, an accept message for the priority service in response to receiving the request message.

Accordingly, the embodiment herein discloses a UE 100 to provide priority services in a wireless network 1000. The UE may include memory 130, a communicator 120, and a processor 110, 140, communicatively coupled with the memory and the communicator. The processor may be configured to: send, to an access and mobility management function (AMF), a request message without an establishment cause associated with a priority service, receive, from the AMF, an accept message for the priority service, based on the AMF identifying that subscription data of the UE in a unified data management (UDM) comprises information related to the priority service and the request message does not include the establishment cause associated with the priority service, and receive, from the AMF, priority services information related to the priority service.

The various actions, acts, blocks, steps, or the like in the flow charts (S600 and S700) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by an access and mobility management function (AMF) in a wireless network, the method comprising:
   receiving, from a user equipment (UE), a registration request message;
   receiving, from a unified data management (UDM), subscription data for the UE; and
   in case that the registration request message does not include an establishment cause, transmitting, to the UE, at least one of a multimedia priority service (MPS) subscription indication or a mission critical service (MCX) subscription indication via a UE configuration update (UCU) procedure,
   wherein the subscription data includes at least one of the MPS subscription indication or the MCX subscription indication.

2. The method of claim 1, further comprising:
   transmitting, to a session management function (SMF), or other network function (NF) in the wireless network, at least one subsequent message including a message priority header indicating the MPS subscription indication or the MCX subscription indication.

3. The method of claim 1, wherein the registration request message is received without the establishment cause in an initial registration request, after the UE receiving priority services information related to the MPS from the AMF, or in case that the UE does not receive the priority services information related to the MPS from the AMF in at least one non-access stratum (NAS) message.

4. The method of claim 2, further comprising:
prioritizing at least one subsequent message based on the subscription data indicating at least one of the MPS subscription indication or the MCX subscription indication in response to receiving the registration request message.

5. A method by a user equipment (UE) in a wireless network, the method comprising:
transmitting, to an access and mobility management function (AMF), a registration request message; and
in case that the registration request message does not include an establishment cause, receiving, from the AMF which received subscription data for the UE, at least one of a multimedia priority service (MPS) subscription indication or a mission critical service (MCX) subscription indication via a UE configuration update (UCU) procedure,
wherein the subscription data includes at least one of the MPS subscription indication or the MCX subscription indication.

6. The method of claim 5, wherein the registration request message is sent without the establishment cause in an initial registration request, after the UE receives priority services information related to the MPS from the AMF, or in case that the UE does not receive the priority services information related to the MPS from the AMF in at least one non-access stratum (NAS) message.

7. An access and mobility management function (AMF) entity in a wireless network, the AMF entity comprising:
memory;
a communicator; and
a processor, communicatively coupled with the memory and the communicator, configured to:
receive, from a user equipment (UE), a registration request message,
receive, from a unified data management (UDM) entity, subscription data for the UE, and
in case that the registration request message does not include an establishment cause, transmit, to the UE, at least one of a multimedia priority service (MPS) subscription indication or a mission critical service (MCX) subscription indication via a UE configuration update (UCU) procedure,
wherein the subscription data includes at least one of the MPS subscription indication or the MCX subscription indication.

8. The AMF entity of claim 7, wherein the processor is configured to:
transmit, to a session management function (SMF) entity or other network function (NF) entity in the wireless network, at least one subsequent message including a message priority header indicating the MPS subscription indication or the MCX subscription indication.

9. The AMF entity of claim 7, wherein the registration request message is received without the establishment cause in an initial registration request, after the UE receives priority services information related to the MPS from the AMF, or in case that UE does not receive the priority services information related to the MPS from the AMF in at least one non-access stratum (NAS) message.

10. The AMF entity of claim 8, wherein the processor is configured to:
prioritize at least one subsequent message based on the subscription data indicating at least one of the MPS subscription indication or the MCX subscription indication in response to receiving the registration request message.

11. A user equipment (UE) in a wireless network, the UE comprising:
memory;
a communicator; and
a processor, communicatively coupled with the memory and the communicator, configured to:
transmit, to an access and mobility management function (AMF) entity, a registration request message, and
in case that the registration request message does not include an establishment cause receive, from the AMF which received subscription data for the UE, at least one of a multimedia priority service (MPS) subscription indication or a mission critical service (MCX) subscription indication via a UE configuration update (UCU) procedure,
wherein the subscription data includes at least one of the MPS subscription indication or the MCX subscription indication.

12. The UE of claim 11, wherein the registration request message is received without the establishment cause in an initial registration request, after the UE receives priority services information related to the MPS from the AMF, or in case that the UE does not receive the priority services information related to the MPS from the AMF in at least one non-access stratum (NAS) message.

* * * * *